UNITED STATES PATENT OFFICE.

EMIL MEYER, OF BERLIN, ASSIGNOR TO CARL UHL & CO., OF BRUNSWICK, GERMANY.

OBTAINING AMMONIA AND OXALIC ACID FROM SUGAR WASTE.

SPECIFICATION forming part of Letters Patent No. 396,705, dated January 22, 1889.

Application filed September 15, 1888. Serial No. 285,519. (No specimens.) Patented in Germany August 28, 1887, No. 43,345; in Belgium December 13, 1887, No. 79,898; in France December 13, 1887, No. 187,573; in England December 16, 1887, No. 17,347, and in Austria-Hungary May 2, 1888 No. 48,884, and No. 10,250.

*To all whom it may concern:*

Be it known that I, Dr. EMIL MEYER, chemist, of Berlin, in the German Empire, have invented certain new and useful Improvements in or relating to the Production of Ammonia and Oxalic Acid and Alkaline Salts from Molasses or from Desaccharized Lyes without Carbonization, (for which I have obtained foreign patents as follows: in Germany, No. 43,345, dated August 28, 1887; in Belgium, No. 79,898, dated December 13, 1887; in France, No. 187,573, dated December 13, 1887; in England, No. 17,347, dated December 16, 1887; in Austria-Hungary, No. 48,884, tom. 38, fol. 1320, May 2, 1888, and No. 10,250/88, tom. XXII, fol. 1217;) and I do hereby declare the nature of this invention and in what manner the same is to be performed to be particularly described and ascertained in and by the following statement.

When molasses or the concentrated lyes of the desaccharized molasse or vinasse are being heated and melted with a large excess of caustic potash or caustic soda, the greater part of the organic matter is destroyed, and during this process the nitrogen of the lyes escapes as ammonia and amine bases in gas form, which is collected in a receiver and treated in any well-known manner, while in the molten mass a considerable quantity of oxalic salts is formed. The product of this decomposition is of a light-yellow color and hardens after cooling to a greenish yellow. According to the quantity of organic matter contained in the molasses a larger or smaller excess of caustic alkali is required, the quantity of which must be at least eight times as great, but not exceeding twenty times the quantity contained in the molasses itself. The alkali is finally recovered completely as carbonate by the subsequent treatment of the mass.

If the alkali and the lyes are mixed at once in the proper proportions and heated together, as soon as the mixture arrives at a certain concentration, especially with lyes rich in nitrogen, the generation of the ammonia is often so sudden and fierce that through a little inattention the whole mass may easily be carried into the receiver. To prevent this, I prefer to proceed in the following manner: In a suitable apparatus—preferably a cast-iron still with head and receiver, which can be heated by direct fire or otherwise—the caustic alkali is placed and heated. To this is then added by a suitable arrangement the predetermined quantity of lye in single doses and at suitable intervals. In this manner a too sudden generation of ammonia is avoided and the generation can be regulated at will by regulating the intervals. The molten mass when finished is run off and partly treated in any well-known manner for the purpose of separating oxalic acid, potash, and other salts. The greater part, however, returns to the process after having been rendered caustic.

For the purpose of rendering it caustic the mass may be dissolved in a part of the thin lyes produced by the desaccharization of molasses, instead of in water, in which case the expense of evaporating the thin caustic alkalies is obviated. The hydrate of lime produced by some desaccharizing processes—for instance, the separation process—may be used for the causticizing. The caustic alkali lye thus produced may be preliminarily evaporated, taking care to collect the small quantity of ammonia thereby generated, and is then returned to the still, in which the proper generation of the ammonia takes place by the addition of the lyes, as described above.

Having now particularly described and ascertained the nature of my said invention and in what manner the same is to be performed, I declare that what I claim is—

1. The novel process which consists in first heating a solution of a caustic alkali in a suitable receptacle, then gradually adding to the said solution at separate intervals a predetermined quantity of concentrated desaccharized lye or its equivalent in the form of molasses, in the proportions hereinbefore set forth, continuing the application of heat, and finally separating the oxalic salts from the resultant mass, substantially as described.

2. The novel process which consists in first heating a solution of a caustic alkali in a suitable receptacle, then adding concentrated desaccharized lye or its equivalent in the form of molasses, continuing the application of heat to liberate all the ammonia, then separating the oxalic salts from the resultant mass, and finally rendering the alkaline residue caustic, whereby it may be used over again, all substantially as and for the purpose set forth.

In testimony whereof I have signed my name to this specification in the presence of two witnesses.

EMIL MEYER.

Witnesses:
MARC M. ROTTEN,
B. ROI.